United States Patent [19]

Ward et al.

[11] Patent Number: 5,030,780

[45] Date of Patent: Jul. 9, 1991

[54] AROMATIC SATURATION PROCESS WITH A SILICA-ALUMINA AND ZEOLITE CATALYST

[75] Inventors: John W. Ward; Dennis D. Delaney, both of Yorba Linda, Calif.

[73] Assignee: Union Oil Company of California, Los Angeles, Calif.

[21] Appl. No.: 558,697

[22] Filed: Jul. 26, 1990

[51] Int. Cl.$^5$ ............................................. C07C 5/10
[52] U.S. Cl. .................................... 585/269; 585/267; 585/270; 208/143
[58] Field of Search ................... 585/267, 269, 270; 208/143

[56] References Cited

U.S. PATENT DOCUMENTS

| | | | |
|---|---|---|---|
| 3,637,484 | 1/1972 | Hansford | 585/269 |
| 3,637,878 | 1/1972 | Hansford | 208/143 |
| 3,703,461 | 11/1972 | Hansford | 208/143 |
| 3,730,878 | 5/1973 | Pollitzer | 585/269 |
| 4,097,365 | 6/1978 | Ward | 208/111 |
| 4,419,271 | 12/1983 | Ward | 208/111 |
| 4,517,074 | 5/1985 | Ward | 208/111 |
| 4,828,676 | 5/1984 | Sawyer et al. | 208/57 |
| 4,849,093 | 7/1989 | Vauk et al. | 585/270 |
| 4,879,019 | 11/1989 | Ward | 208/111 |

FOREIGN PATENT DOCUMENTS

WO89/03367  4/1989  PCT Int'l Appl.

*Primary Examiner*—Patrick P. Garvin
*Assistant Examiner*—E. D. Irzinski
*Attorney, Agent, or Firm*—Alan H. Thompson; Gregory F. Wirzbicki

[57] ABSTRACT

A catalyst typically containing nickel and tungsten on a support containing (a) a dispersion of silica-alumina in an alumina matrix and (b) an ultra-hydrophobic zeolite is utilized for converting relatively low boiling hydrocarbon-containing feedstocks. The catalyst is particularly effective for promoting aromatic saturation reactions, particularly in diesel fuel feedstocks.

24 Claims, No Drawings

AROMATIC SATURATION PROCESS WITH A SILICA-ALUMINA AND ZEOLITE CATALYST

BACKGROUND OF THE INVENTION

The invention relates to catalyzed aromatic saturation processes.

In the refining of hydrocarbon-containing feedstocks, it is often necessary to convert hydrocarbon compounds contained in the feedstock to different forms. Typically, particulate catalysts are utilized to promote chemical reactions when feedstocks contact such catalysts under hydrocarbon conversion conditions to produce economically or environmentally upgraded hydrocarbon products. During the course of catalytic refining of hydrocarbons, heterocyclic compounds, including oxygen, nitrogen and sulfur compounds, are removed from hydrocarbon-containing feedstocks. Aromatic compounds contained in a feedstock are catalytically processed in the presence of hydrogen, causing conversion of such aromatic compounds to more saturated forms, i.e., the aromatic compounds are hydrogenated.

An on-going aim of the art is to provide a catalyst having suitably high activity and stability. Activity may be determined by comparing the temperature at which various catalysts must be utilized under otherwise constant processing conditions with the same feedstock so as to produce a given percentage of a given product. The lower activity temperature for a given catalyst, the more active such a catalyst is in relation to a catalyst of higher activity temperature. Alternatively, activity may be determined by comparing the percentages of conversion of feedstock reactants to a given product when various catalysts are utilized under otherwise constant processing conditions with the same feedstock. The higher the percentage of converted product for a given catalyst, the more active such a catalyst is in relation to a catalyst converting a lower percentage of the same feedstock reactants to the same product. As a catalyst deactivates during processing, its stability (i.e., deactivation resistance) is generally measured in terms of the change in temperature required per unit of time to maintain a given percentage of product, or alternatively, in terms of the change in percentage of product per unit of time. The lower the change in percentage of product per time unit for a given catalyst, the more stable such a catalyst is in relation to a catalyst yielding a greater change.

Recent legislation has increased the demands for refiners to reduce the content of environmentally undesirable aromatic-containing compounds in fuel products such as diesel fuels. Catalytic aromatic saturation is a useful refining process for such reduction. Aromatic saturation involves the conversion of aromatic-containing compounds, into environmentally acceptable, more saturated hydrocarbon-containing product compounds. Typically, aromatic-containing compounds such as substituted mono-aromatics and the like are saturated and thus converted to naphthenes and other related saturated hydrocarbon product compounds. Several hydrotreating catalysts have been utilized to promote such reactions. A typical catalyst contains hydrogenation metals supported on a porous refractory oxide. Such a catalyst provides suitable aromatic saturation activity (i.e., percentage conversion of aromatic compounds to products containing a greater hydrogen to carbon ratio, e.g., more saturated products); however, the search continues for catalysts providing improved activity and stability.

SUMMARY OF THE INVENTION

The invention provides a process for saturating aromatic compounds utilizing a catalyst comprising at least one hydrogenation metal component on a support containing a zeolite and an amorphous, porous refractory oxide. A preferred catalyst contains hydrogenation metal components selected from Group VIB and Group VIII supported on a porous refractory oxide containing (1) a dispersion of silica-alumina in an alumina matrix combined with (2) the zeolite. The catalyst is typically contacted under aromatic saturation conditions with a feedstock containing at least about 10 volume percent aromatic compounds, typically in the form of mono-aromatic, di-aromatics or tri-aromatics, to produce hydrocarbon-containing compounds more saturated than those of the feedstock. In particular, a feedstock containing substantially all components boiling in a diesel range, e.g., from 140° C. to 371° C., and further containing aromatic compounds, can be converted to hydrocarbon-containing products having a reduced aromatic content.

Advantages derived from such a process include operating the aromatic saturation process at substantially lower temperatures or saturating a greater percentage of aromatics than comparable processes, and extending the processing term before shut down.

DETAILED DESCRIPTION OF THE INVENTION

The invention is directed to a novel process for converting a hydrocarbon-containing feedstock to upgraded hydrocarbon products. More specifically, aromatic saturation reactions are promoted by a catalyst comprising a zeolite in combination with an amorphous, porous refractory oxide, particularly a porous refractory oxide containing a dispersion of silica-alumina in an alumina matrix. Ordinarily, the catalysts utilized in the present invention contain hydrogenation metal components, including Group VIB and/or Group VIII metal components, and optionally phosphorus components.

Among the useful catalyst materials in the present invention are the catalysts and supports disclosed in U.S. Pat. Nos. 4,610,973 and 4,419,271, herein incorporated by reference in their entireties. Such patents describe catalysts containing the dispersions described herein and the combination of at least one zeolite with the dispersion. However, in contrast to the main teachings in these patents wherein the catalysts are employed to promote reactions involving substantial cracking of the reactants, particularly hydrocracking of feedstock components boiling above 371° C. to products boiling in the 371° C. minus range, the catalysts in the present invention are utilized to promote aromatic saturation reactions involving essentially no cracking of the feedstock components, e.g., less than 5 percent cracking of the feedstock components. More specifically, in the aromatic saturation reactions of the present invention, the homocyclic aromatic ring or rings in a given aromatic-containing compound of the feedstock is (are) essentially not cracked or opened, or does cracking occur at the non-aromatic portions of such compounds. In further contrast, the process of the present invention yields product components having increased molecular weight, primarily due to the increase in hydrogen content of the products as a result of hydrogenative saturation of the aromatic-containing compounds of the feedstock.

The dispersions contained in the catalyst supports have about 5 to about 98 weight percent of a finely divided, silica-alumina component dispersed in an alumina matrix, although it is preferred that the dispersion contain about 20 to about 90 weight percent of the silica-alumina component. The silica-alumina component of the dispersion preferably contains a silica-alumina cogel or copolymer containing about 35 to 96, and most preferably about 50 to about 90 weight percent $SiO_2$.

The catalyst can contain the dispersion as a component of a support containing a combination of discrete finished dispersion materials further dispersed with amorphous, porous refractory oxides such as aluminas, titanias, and the like. Aluminosilicates such as zeolites can also be contained in such supports. Such combinations of zeolites and dispersions can further contain conventional binder materials. Preferably, the catalysts and supports described herein contain a dispersion of silica-alumina in a gamma alumina matrix. Preferably, the finished dispersion consists essentially of amorphous materials in combination with crystalline materials such as crystalline zeolitic or nonzeolitic molecular sieves.

The suitable zeolites for use herein include crystalline aluminosilicate molecular sieves, including naturally-occurring and synthetic crystalline aluminosilicate zeolites known in the art. Examples are faujasite, mordenite, erionite, Zeolite-Y, Zeolite-X, Zeolite L, Zeolite Omega, Zeolite ZSM-4, Zeolite beta, and their modifications. Such modifications include, for example, replacement of alkali metals in the zeolites with multivalent metal-containing cations, hydrogen ions, or hydrogen ion precursors (e.g., ammonium ion), by methods such as ion-exchange, to reduce the alkali metals to less than 1 weight percent, preferably less than 0.5 weight percent, and most preferably less than 0.3 weight percent, calculated as the alkali metal oxides.

In addition to the zeolites referred to above, many other crystalline aluminosilicate zeolites in their non alkali metal forms may be utilized in the catalyst support described herein. Preferred zeolites contain at least 50 percent of their pore volume in pores of diameter greater than 8 Angstroms, with Zeolite Y (and its modifications) being preferred. Also preferred are zeolites that have been ion-exchanged and then steam stabilized.

A preferred Y zeolite for use as the starting zeolite in preparing a catalyst utilized in the invention is one produced by first ammonium exchanging a Y zeolite to a sodium content between about 0.6 and 5 weight percent, calculated as $Na_2O$, calcining the ammonium-exchanged zeolite at a temperature between about 315° C. and 900° C. in the presence of steam at a water vapor partial pressure of at least 0.2 p.s.i.a. to reduce the unit cell size of the ammonium-exchanged zeolite to a value in the range between about 24.40 and 24.64 Angstroms, and then ammonium exchanging the steam calcined zeolite to replace at least 25 percent of the residual sodium ions and obtain a zeolite product of less than about 1.0 weight percent sodium, preferably less than about 0.6 weight percent sodium, calculated as $Na_2O$. Such a Y zeolite is highly stable and maintains a high activity. The zeolite is described in detail in U.S. Pat. No. 3,929,672, the disclosure of which is hereby incorporated by reference in its entirety. The same or a similar zeolite is sold by the Linde Division of Union Carbide Corporation as LZY-82 zeolite. Other preferred Y zeolites are prepared in the same manner as described above except that, instead of exchanging the steam calcined zeolite with ammonium ions, the zeolite is leached with a solution of an organic chelating agent, such as EDTA, or an inorganic or organic acid. Preferably, the steam calcined zeolite is leached with a dilute solution of hydrochloric or sulfuric acid ranging in concentration between about 0.01 and about 10N. Zeolites prepared in the abovedescribed manner are disclosed in U.K. Patent Application No. 2,114,594 published Aug. 24, 1983, the disclosure of which is hereby incorporated by reference in its entirety.

Highly preferred zeolites for use herein are prepared by a method including a second steam calcination step. The second steam calcination is generally carried out for a period of time correlated with the severity of the calcination conditions, especially the water vapor partial pressure and the calcination temperature, so as to convert the zeolite in the support to an ultrahydrophobic zeolite. The desired ultrahydrophobic zeolites have a unit cell size between about 24.20 and about 24.45 Angstroms, preferably between about 24.20 and 24.35 Angstroms, and a sorptive capacity for water vapor less than about 5 weight percent, preferably less than about 4 weight percent, of the zeolite at 25° C. and a p/p° value of 0.10. The zeolites are the same or similar to the UHP-Y zeolites disclosed in U.S. Pat. No. 4,401,556 and U.K. Patent No. 2,014,970 published on June 29, 1982, the disclosure of the latter patent being hereby incorporated by reference in its entirety. According to these references, a UHP-Y zeolite is defined as a zeolite having a silica-to-alumina mole ratio of from 4.5 to 35, the essential X-ray powder diffraction pattern of zeolite Y, an ion exchange capacity of not greater than 0.070, a unit cell size from 24.20 to 24.45 Angstroms, a surface area of at least 350 meters$^2$/gram (B-E-T), a sorptive capacity for water vapor less than 5 weight percent at 25° C. and a p/p° value of 0.10 and a Residual Butanol Test Value of not more than 0.4 weight percent. The Residual Butanol Test is a measure of the adsorptive selectivity of zeolite absorbents for relatively nonpolar organic molecules under conditions in which there is active competition between water and less polar molecules for adsorption on the zeolite. The test procedure is described in detail in the above-identified patents.

Preferably, the second steam calcination is carried out under conditions such that the ultrahydrophobic zeolite formed during the calcination has a silica-to-alumina mole ratio between about 4.5 and about 9, the essential X-ray powder diffraction pattern of zeolite Y, an ion-exchange capacity of not greater than 0.070, and a Residual Butanol Test Value of not more than 0.4 weight percent. More preferably, the steam calcination is carried out under conditions such that LZ-10 zeolite is formed. LZ-10 zeolite is a modified Y zeolite having a silica-to-alumina mole ratio between about 4.5 and about 6.0, a surface area between about 500 and 700 meters$^2$/gram, a unit cell size between about 24.20 and about 24.35 Angstroms, and a sorptive capacity for water vapor less than 5 percent by weight of the zeolite at 25° C. and a p/p° value of 0.10.

Another highly preferred zeolite for use herein includes the Zeolite Y disclosed in PCT International Application SE87/00464, filed Oct. 13, 1987, the disclosure of which is incorporated by reference in its entirety, wherein after ammonium ion exchange followed by drying and a first steam calcination, aluminum ions are exchanged followed by drying, a second steam calcination and the unit cell size is reduced to the range from 24.15-24.35 Angstroms.

The support material utilized in the invention usually comprises between 2 and about 80 weight percent, preferably between about 10 and about 75 weight percent, of the crystalline aluminosilicate zeolite (particularly the ultrahydrophobic zeolites, such as LZ-10). The dispersion comprises a substantial proportion of the support, usually at least 15 percent by weight of the support, ordinarily greater than 50 percent by weight, with the preferred and most preferred proportions being in the respective ranges from about 50 to about 90 weight percent and about 55 and 85 weight percent, with the balance comprising the zeolite and a binder such as one or more porous, amorphous refractory oxides, including for example, aluminas, titanias, etc., clays, and the like. A highly preferred support contains about 60 to about 80 percent by weight of the dispersion.

The catalysts, supports or support components are composed of an alumina gel matrix (preferably a large pore alumina), in which a finely divided, intimately composited silica-alumina component is dispersed. Typically, these dispersions are non-crystalline, amorphous supports prepared by comulling an alumina hydrogel with a homogeneous silica-alumina cogel in hydrous or dry form, or with a "graft copolymer" of silica and alumina, and subsequently extruding the homogenized mixture to provide extrudates of the support of about 1/32 to about ⅛ inch cross-sectional diameter. Alternatively, to provide a more highly porous structure, the homogeneous mixture may first be spray-dried, then remulled with added water and extruded. Amorphous silica-alumina cogel components are prepared by conventional coprecipitation methods, e.g., as described in U.S. Pat. No. 3,210,294. Amorphous silica-alumina graft copolymers are prepared in a known manner by impregnating silica hydrogel with an aluminum salt followed by precipitation of alumina gel with ammonium hydroxide in the pores of the silica hydrogel. The composition and principal physical characteristics of the dried and calcined support fall within the approximate ranges:

TABLE I

|  | Broad Range | Preferred Range |
| --- | --- | --- |
| Wt. % Cogel or Copolymer | 5-98 | 20-90 |
| Wt. % SiO$_2$ in Cogel or Copolymer | 20-96 | 50-90 |
| Overall SiO$_2$ Content of Support, Wt. % | 5-80 | 35-80 |
| Pore Volume, ml/g | 0.5-2.0 | 0.8-2.0 |
| Surface Area, m$^2$/g | 150-700 | 300-600 |
| Av. Pore Diameter, Ang. | 50-150 | 70-130 |
| Percent of Pore Volume in Pores of Diameter Greater than: |  |  |
| 100 Ang. | 10-80 | 25-70 |
| 500 Ang. | 5-60 | 20-50 |

The mulled mixture of alumina gel with either a silica-alumina cogel or a silica and alumina "graft copolymer" may be utilized in the gel form or may be dried and/or calcined prior to combination with the zeolite. In a preferred method of preparation, the cogel or copolymer is spray dried and then crushed to a powdered form, following which the powder is mulled with a zeolite powder containing hydrogen ions, hydrogen ion precursors, or multivalent metal-containing cations, the amounts of cogel or copolymer mulled with the zeolite being such that the support will ultimately contain zeolite and dispersion in the proportions set forth hereinbefore. If desired, a binder may also be incorporated into the mulling mixture, as also may one or more active metal hydrogenation components in forms such as ammonium heptamolybdate, nickel nitrate or chloride, ammonium metatungstate, cobalt nitrate or chloride, etc. After mulling, the mixture is extruded through a die having suitable openings therein, such as circular or polylobal openings of diameters between about 1/32 and ⅛ inch. The extruded material is cut into lengths of about 1/32 to ¾ inch, preferably ¼ to ½ inch, dried, and calcined at an elevated temperature.

If desired, hydrogenation components may be composited with the support by impregnation; that is, rather than comulling the hydrogenation components with the support materials, the zeolite and dispersion are mulled, extruded, cut into appropriate lengths, and calcined. The resulting particles are then contacted with one or more solutions containing the desired hydrogenation components in dissolved form, and the composite particles thus prepared are dried and calcined to produce finished catalyst particles.

Usually, the finished catalyst contains at least about 0.5 weight percent of hydrogenation components, calculated as the metals. In the usual instance, wherein a Group VIII metal and a Group VIB metal component are utilized in combination, the finished catalyst contains between about 5 percent and 35 percent, preferably between about 10 and 30 percent by weight, calculated as the respective trioxides, of the Group VIB metal components and between about 2 percent and 15 percent, preferably between 3 and 10 percent by weight calculated as the respective monoxides, of the Group VIII metal components. Non-noble Group VIII metals such as nickel and cobalt are preferred. Furthermore, the cross-sectional shapes of the extruded, dried and calcined supports disclosed herein are preferably trilobal or tetralobal. Examples of such shaped supports are disclosed in U.S. Pat. No. 4,610,973.

In order to provide more suitable catalytic activity, the support can also be composited with phosphorus. Phosphorus is generally employed in the range between about 0.5 and about 15, preferably about 1 to about 8 and most preferably about 2 to about 7, weight percent, calculated as P.

The phosphorus components may be added to the support by several methods which can provide a homogeneous and intimate dispersion thereof on the support. The phosphorus component(s) may be incorporated into the wet support mixture during the mulling stage prior to extrusion. However, the phosphorus is preferably added by impregnation with an aqueous solution containing phosphorus components, after drying and calcining of the support particles.

One preferred catalyst employed in the invention contains about 2 to about 6 weight percent of nickel components, calculated as NiO, from about 17 to about 35 weight percent of tungsten components, calculated as WO$_3$, and optionally, about 3 to about 15 weight percent of phosphorus components, calculated as P$_2$O$_5$, on a support comprising a zeolite having an alkali metal content less than 5 percent and the dispersion of silica-alumina in a gamma alumina matrix. Physical characteristics of this catalyst include a total pore volume of about 0.25 to about 1.00 cc/gram, a surface area from about 100 to about 400 m$^2$/gram and a median pore diameter in the range of about 50 to about 150 angstroms.

A highly preferred catalyst employed in the invention contains about 2 to about 6 weight percent of nickel component, calculated as NiO, from about 17 to about 27 weight percent of tungsten components, calculated as $WO_3$, on a support containing greater than 50 weight percent of the dispersion of silica-alumina in gamma alumina and an ultrahydrophobic Y-zeolite having a unit cell size less than 24.45, such as LZ-10.

Catalysts are activated in accordance with methods suited to an aromatic saturation process. Most of the catalysts used in the process of the invention are more active, sometimes even far more active, in a sulfided form than in the oxide form in which they are generally prepared. Accordingly, the catalyst used herein may be sulfided prior to use by any known method (in which case the procedure is termed "presulfiding"), for example, by passing a sulfiding agent over the catalyst prepared in the calcined form. Temperatures between 150° C. and 371° C. and gaseous space velocities between about 140 and 500 v/v/hr are generally employed, and this treatment is usually continued for at least about two hours. A mixture of hydrogen and one or more components selected from the group consisting of sulfur vapor and sulfur compounds (e.g., lower molecular weight thiols, organic sulfides, and especially $H_2S$) is suitable for presulfiding. Generally speaking, the relative proportion of sulfiding compounds in the presulfiding mixture is not critical, with any proportion of sulfur ranging between 0.01 and 15 percent by volume, calculated as S, being adequate. Also, liquid sulfiding agents, such as dimethyl disulfide and the like, may be used for presulfiding.

If the catalyst is to be used in a sulfided form, it is preferred that a presulfiding procedure be employed. However, since the aromatic saturation process may be employed to upgrade feedstocks containing a portion of sulfur-containing hydrocarbons (i.e., hydrodesulfurization), one may, as an alternative, accomplish the sulfiding in situ with sulfur-containing hydrocarbon feedstocks, particularly those containing sufficient sulfur to maintain the catalyst in the sulfided form. In another alternative form, the catalyst may be sulfided ex situ by treatment with a sulfur-containing medium prior to loading into a reactor vessel.

As used herein, "hydrocarbon" refers to any compound which consists of hydrogen and carbon, and "hydrocarbon-containing feedstock" refers to any charge stock which contains greater than about 90 weight percent carbon and hydrogen, calculated as the elements. Contemplated for treatment by the process of the invention are hydrocarbon-containing liquids and gases, including broadly liquid, liquid/vapor and vapor hydrocarbon mixtures, particularly those containing aromatic compounds. Among the typical feedstocks contemplated are those wherein at least about 90 volume percent of the components boil below 371° C., and preferably below 343° C., particularly those obtained from a cracking or hydrocracking process which contain aromatic compounds. Hydrocarbon compounds converted by the process of the invention include aromatic compounds and derivatives thereof in addition to relatively small amounts of organonitrogen and organosulfur compounds. Typical aromatic compounds contained in the feedstocks include mono-aromatic, di-aromatic, and triaromatics, particularly those normally boiling below about 343° C. Examples of aromatics contained in the feedstocks include mon-aromatics such as alkyl benzenes, indans/tetralins and dinaphthene benzenes, di-aromatics such as naphthalenes, biphenyls and fluorenes, and tri-aromatics such as phenanthrenes and naphphenanthrenes. Although feedstocks containing a substantial proportion of polyaromatics are preferred (i.e., up to 100 weight percent of the total aromatics in such feedstocks can be comprised of poly-aromatics), a commonly processed feedstock of the invention contains a substantial proportion of mono-aromatics and a relatively small proportion of polyaromatics. The mono-aromatic content of the total aromatics in the feedstock is usually greater than 50 weight percent. For use herein, typical hydrocarbon distillate fractions, or mixtures thereof, contain at least about 10 volume percent of aromatic hydrocarbon compounds. The most highly preferred feedstock process in the present invention is a diesel fuel feedstock containing at least 10, often at least 20, and commonly more than 30 volume percent of aromatic containing compounds, with typical ranges from about 10 to about 80 and often about 20 to 50 volume percent. The maximum benefit of the process of the present invention is achieved as higher concentrations of the aromatics in the feedstock are saturated without substantial cracking of homocyclic aromatics. Generally, a substantial proportion (i.e., at least about 90 volume percent) of the hydrocarbon-containing feedstocks processed in the present invention, such as diesel fuels and the like, boil at a temperature less than about 371° C., preferably less than about 343° C., and usually boil entirely within the range of about 232° C. to about 343° C.

The catalyst may be employed as either a fixed, slurried or fluidized bed (but most usually a fixed bed) of particulates in a suitable reactor vessel wherein a hydrocarbon-containing feedstock (liquid, gaseous, or mixtures thereof) to be treated is introduced and subjected to hydroconversion conditions including an elevated total pressure, temperature, and a hydrogen partial pressure, so as to effect the desired degree of conversion.

Typical hydroconversion operation conditions include a temperature from about 50° C. to about 500° C., a pressure from about 50 p.s.i.g. to about 4,000 p.s.i.g., and a liquid hourly space velocity of about 0.05 to about 25 vol/vol-hr. The hydrocarbon-containing feedstock contacts the catalyst under hydroconversion conditions including a hydrogen recycle rate usually about 1,000 to about 15,000, and preferably about 1,000 to about 6,000 standard cubic feet per barrel (scf/bbl). Preferred conditions for saturation of hydrocarbon compounds having at least one unsaturated carbon-to-carbon bond (particularly aromatic-containing compounds) include a temperature from about 200° C. to about 400° C., a hydrogen partial pressure usually about 200 to about 3,000 p.s.i.g., but preferably about 400 to about 1,500 p.s.i.g. at a space velocity usually about 0.5 to less than 5.0 LHSV so as to effect the desired degree of saturation. Aromatic saturation requires the conversion of at least 10, and preferably at least 25 volume percent of the feedstock aromatic hydrocarbons boiling at less than about 371° C. to products boiling below 371° C. from a single pass of the feedstock.

Although virtually any hydrocarbon feedstock having a substantial proportion of components boiling in the diesel range may be treated by aromatic saturation, the process is particularly suited to treating a diesel fraction ordinarily containing at least 5 weight percent of aromatic compounds, and usually in the range from 10 to 80 weight percent of aromatics. The diesel fraction is referred to hereinas that hydrocarbon-containing fraction boiling in the range from 140° C. to 371° C. Preferably, the diesel fraction contains about 20 to about 60 volume percent of aromatics, and most preferably about 25 to about 50 volume percent. Sulfur is usually present in such fractions in all forms, including paraffinic and heterocyclic, in a proportion not exceeding about 3.0 weight percent and often less than 1.0 weight percent, calculated as S. The feedstock may contain a relatively low sulfur content, such as less than about 0.75 weight percent and sometimes less than 0.5 weight percent; however, the sulfur content of the feedstock is usually sufficient to maintain the catalyst in the sulfided form which is normally greater than 20 ppmw and often greater than 50 ppmw, calculated as S. Frequently, the feedstock contains undesirable proportions of nitrogen, which in a concentration not exceeding about 1.0 weight percent and often between about 0.01 and 0.1 weight percent, calculated as N, can be tolerated during processing. Although it is highly preferred that the feedstock contain essentially no nitrogen (i.e., less than 100 ppmw, calculated as N), a relatively low content of nitrogen is commonly tolerated—about 100 ppmw to about 300 ppmw.

In a preferred embodiment for saturating aromatic-containing compounds, both the hydrocarbon-containing feedstocks and the resulting products typically comprise fractions that boil in the diesel range. The process is preferably conducted in a temperature range from about 250° C. to about 382° C., a total pressure in the range from about 500 to about 1,400 p.s.i.g., a liquid hourly space velocity of about 0.5 to about 2.0 (LHSV), and a hydrogen rate of about 3,000 to about 5,000 scf/bbl. Because the conversion of unsaturated compounds to saturates is equilibrium limited, one is thermodynamically limited to a maximum temperature which favors the production of saturated products over unsaturates. In general, this maximum temperature is between about 371° to 382° C. Temperatures above that region tend to force the equilibrium towards unsaturated compounds, whereas lower temperatures favor the desired production of saturated compounds.

The results obtained in any particular process will depend upon the nature of the catalyst, the nature of the feedstock, and the severity of the operating conditions. It is preferred that at least 15 volume percent and, more preferably, at least 20 volume percent of the feedstock containing aromatic components is converted to saturated products in a single pass; however, the maximum conversion is usually greater than 40 volume percent and often greater than 65 volume percent. It is highly preferred that the aromatic compounds contained in the feedstock be reduced, in a single pass, to less than 20 volume percent, preferably less than 10 volume percent, and most preferably less than 5 volume percent of the effluent, and the sulfur content of the feedstock is reduced to less than about 500 ppmw, and preferably less than 5 ppmw, calculated as S.

Furthermore, in the process of the invention the boiling point range of the feedstock compared to the boiling point range of the products is not substantially reduced, and often the process involves essentially no reduction of such ranges. Since the preferred process of the present invention involves reactions which do not crack the homocyclic feedstock reactants, no substantial overall molecular weight reduction occurs during the conversion of reactants to products. Typically, the addition of hydrogen to the reactants provides products of increased overall molecular weight.

Ordinarily a reactor that is part of a hydroprocessing unit, or units, in a refinery is utilized. In the saturation of aromatic-containing hydrocarbon compounds in a feedstock, the catalyst is usually maintained as a fixed bed with the feedstock passing downwardly once therethrough, either in series or parallel. If the feedstock is unusually high in organonitrogen and organosulfur compounds, it may be pretreated, integrally or separately, using a hydrotreating catalyst. A preferred process utilizes the catalysts described herein in a reactor for concurrent hydrotreating and aromatic saturation or one located downstream of a hydrotreating reactor. After pretreatment, the total pressure in a downstream reactor is usually increased when the hydrotreated effluent is contacted with the catalyst under aromatic saturation conditions.

Generally, the hydrogen partial pressure maintained during hydroconversion is more than 50 percent of the total pressure. Usually, for once-through operation, the hydrogen partial pressure is between about 85 and 95 percent of the total pressure while, for recycle operation, the hydrogen partial pressure is somewhat lower, i.e., between 80 and 85 percent of the total pressure.

The hydroconversion process of the invention may include either serial or simultaneous desulfurization, denitrogenation and saturation of aromatic-containing compounds of a feedstock. Simultaneous desulfurization, denitrogenation and aromatic saturation, as used herein, involves contacting a hydrocarbon-containing feedstock with the catalyst disclosed herein under conditions effecting (1) a lower sulfur and/or nitrogen content in the effluent and (2) a lower percentage of aromatic-containing products in the effluent as compared to the feedstock. Typical hydroconversion conditions above include a temperature from about 200° C. to about 400° C., a total pressure from about 200 to about 3,000 p.s.i.g., a space velocity of about 0.5 to about 5.0, and a hydrogen rate from about 2,000 to about 6,000 scf/bbl. Serial desulfurization and denitrogenation of a feedstock involves either removing sulfur and nitrogen from the feedstock prior to contact of the catalyst disclosed herein or removing sulfur and nitrogen from the effluent of such a process. In serial processes, the sulfur content in the feedstock is nevertheless maintained at a concentration that maintains the catalyst in the sulfided form.

The invention is further illustrated by the following examples which are illustrative of specific modes of practicing the invention and are not intended as limiting the scope of the invention defined by the appended claims.

EXAMPLE 1

Catalysts, designated as Catalyst A and B, are prepared in accordance with the invention.

Catalyst A is prepared as follows: A support containing overall 55 weight percent of silica and 45 weight percent of alumina is prepared by mulling approximately 70 parts by dry weight of an approximately 75/25 silica/alumina graft copolymer ($Al_2O_3$ precipitated via aluminum sulfate into the pores of a preformed silica gel) with approximately 30 parts by weight of hydrous alumina gel, followed by spray drying. The spray dried composite is then remulled with water and extruded through a die producing 1/16 inch cross-sectioned clover-leaf extruded matter (the cross-sectional width is measured by maximum distance across two such clover leaves), which, after being broken into extrudates of about 0.1 to about 0.6 inch lengths, is oven dried at 110° C. for 2 hours and calcined at 649° C. for 2 hours.

The silica-alumina/alumina dispersion support particles (112.2 gms) are impregnated with a solution containing nickel nitrate hexahydrate and ammonium metatungstate dissolved in an aqueous solution. After impregnation by pore saturation, the catalyst is air dried for 4 hours and then oven dried for 16 hours. The catalyst is then calcined at 482° C. in flowing air for 16 hours. A final catalyst is produced having a nominal composition as follows: 4.0 weight percent of nickel components, calculated as NiO, and 24 weight percent of tungsten components, calculated as $WO_3$, with the balance comprising the silica-alumina/alumina dispersion support.

Catalyst B is prepared in a similar manner as Catalyst A, except the support particles contain approximately 10 weight percent of LZ-10 zeolite, approximately 70 weight percent of the silica-alumina/alumina dispersion contained in Catalyst A above, and 20 weight percent of alumina binder. The spray dried composite disclosed above is crushed to a powder and mulled with an LZ-10 zeolite powder and Catapal alumina binder powder, then remulled with water and extruded. Catalyst B contains a nominal composition of 4.0 weight percent of nickel components, calculated as NiO, and 22 weight percent of tungsten components, calculated as $WO_3$, with the balance comprising the support containing the zeolite, dispersion of silica-alumina/alumina and the alumina binder.

A reference catalyst, Catalyst X, is prepared in the same manner as Catalyst A, except Catalyst X is prepared with a conventional gamma alumina support having the characteristics disclosed in Table II below. Catalyst X contains approximately 4 weight percent of nickel components (as NiO) and approximately 19.5 weight percent of tungsten components (as $WO_3$) The porosity characteristics of Catalyst X are shown in Table II as follows:

TABLE II

| Pore Diameter Angstroms | Catalyst X % Pore Vol. |
|---|---|
| 40–50 | 0.2 |
| <50 | 0.4 |
| 50–60 | 1.6 |
| 60–70 | 9.0 |
| 70–80 | 42.0 |
| 80–90 | 39.7 |
| >90 | 7.3 |
| 90–100 | 0.8 |
| 100–110 | 0.5 |
| 110–120 | 0.3 |
| 120–130 | 0.3 |
| >130 | 5.4 |
| PORE VOLUME cc/gram (Merc. Poros.) | 0.44 |
| MEDIAN PORE DIAMETER, ang. (Merc. Poros.) | 79 |
| SURFACE AREA m²/gram | 220 |

The catalysts are tested for their activity for aromatic saturation of a hydrocarbon-containing feedstock containing essentially all diesel distillate. The feedstock contains 5680 ppmw of sulfur, calculated as S, 240 ppmw of nitrogen, calculated as N, 29.5 volume percent of aromatic-containing compounds, calculated by Hydrocarbon Types in Liquid Petroleum Products by Fluorescent Indicator Adsorption (ASTM D-1314), and 13.09 weight percent hydrogen, calculated as H.

The test is conducted by contacting the catalysts in separate runs with the above described feedstock under aromatic saturation conditions. However, at the outset of each run, the respective catalysts are presulfided by contact for about 16 to 20 hours with a gas consisting of 90 volume percent $H_2$ and 10 volume percent $H_2S$ flowing at 0.7 SCF/hr (one atmosphere pressure). The temperature during the presulfiding is initially at room temperature, is increased gradually until 371° C. is reached and held for 2 hours, and then lowered to 288° C., at which time the catalyst is contacted with the feedstock.

The feedstock is passed downwardly through a reactor vessel and contacted in separate runs with Catalysts A, B and X in a single-stage, single-pass system with once-through hydrogen. The operating conditions during each run are summarized as follows: 1,200 p.s.i.g. hydrogen pressure (total pressure), 1.0 LHSV, a hydrogen rate of 4,000 SCF/bbl, and temperature of 360° C.

Giving Catalyst X, employed in the reference aromatic saturation hydroprocess, an arbitrary activity of 100, relative activities of Catalysts A and B for aromatic saturation are determined by calculation and tabulated in comparison to Catalyst X in Table IV. These activity determinations are based on a comparison of the reaction rates for aromatic saturation obtained from data of the experimental run according to the following standard equation which assumes first order kinetics for aromatic saturation:

Relative Volume
Aromatic Saturation $= \dfrac{\ln[C_f/C_p]}{\ln[C_{fr}/C_{pr}]} \times 100$ Activity $\ln[C_{fr}/C_{pr}]$ where $C_{fr}$ and $C_{pr}$ are the respective concentrations of aromatics in the feed and product obtained with the catalyst employed in the reference process and $C_f$ and $C_p$ are the respective concentrations of aromatics in the feed and product obtained with a catalyst being compared to the reference.

The sulfur, nitrogen and aromatic contents in the product hydrocarbon obtained for each catalyst as well as the relative volume aromatic saturation activity are set forth in the following Table IV for the separate runs of equivalent length of time (approximately 100 hours).

TABLE IV

| Catalyst | Arom. Vol. % | RVA | S,ppmw | N,ppmw |
|---|---|---|---|---|
| A(Ni/24% WO₃) | 20.1 | 70 | <5 | ~0.1 |
| B(Ni/22% WO₃/LZ-10) | 16.3 | 109 | <5 | ~0.1 |
| X(Ni/19.5% WO₃) | 17.1 | 100 | <5 | ~16.5 |

The data in Table IV clearly indicate that Catalysts A and B are useful for aromatic saturation of a typical diesel distillate feedstock. In addition, the data obtained evidence the superiority of the process using Catalyst B over that of the reference catalyst and Catalyst A containing tungsten. Based on the data in Table IV, the catalyst of the invention markedly superior to the reference catalysts for saturating aromatics.

Although the invention has been described in conjunction with its preferred embodiment and examples, many variations, modifications, and alternatives will be apparent to those skilled in the art. Accordingly, it is intended to embrace within the invention all such variations, modifications, and alternatives that fall within the spirit and scope of the appended claims.

We claim:

1. A process for saturating aromatic compounds contained in a hydrocarbon-containing feedstock, said process comprising contacting a particulate catalyst comprising at least one hydrogenation metal component on a support containing a zeolite and a dispersion of silica-alumina in alumina with a feedstock containing aromatic compounds and a substantial proportion of feedstock components boiling at less than about 371° C. under aromatic saturation conditions comprising the presence of hydrogen and an elevated temperature in the range from about 200° C. to about 400° C. and elevated pressure to produce a product containing more saturated forms of said aromatic compounds derived from said feedstock, and wherein said conditions effect substantially no cracking of said aromatic compounds contained in said feedstock.

2. The process defined in claim 1 wherein said feedstock comprises about 10 to about 80 volume percent of aromatic compounds.

3. THe process defined in claim 1 wherein said catalyst further comprises at least one supported Group VIB metal hydrogenation component or at least one supported VIII metal hydrogenation component.

4. The process defined in claim 3 wherein said catalyst further comprises at least one phosphorus component.

5. The process defined in claim 1 wherein said zeolite is ultrahydrophobic and contains less than 5 weight percent of alkali metal components, calculated as the monoxide.

6. The process defined in claim 1 wherein said aromatic saturation conditions comprise the presence of hydrogen, a temperature range from about 250° C. to about 382° C. and a total pressure in the range from about 500 to about 1,400 p.s.i.g.

7. The process defined in claim 1 wherein said feedstock comprises a diesel fraction having substantially all components boiling in the range from 140° C. to 371° C.

8. The process defined in claim 1 wherein said dispersion comprises at least about 50 weight percent of said support.

9. The process defined in claim 1 wherein the boiling point ranges are substantially the same for (1) said feedstock and (2) said product of said process.

10. The process defined in claim 1 wherein said feedstock and said product contain homocyclic aromatic components and the average molecular weight of said homocyclic aromatic components contained in said feedstock is increased by about 0.1 to about 5 percent compared to that in said product.

11. The process defined in claim 1 wherein said zeolite comprises a Zeolite Y having a unit cell size less than 24.45.

12. A process for saturating aromatic compounds contained in a hydrocarbon-containing feedstock, said process comprising contacting a particulate catalyst comprising at least one active nickel hydrogenation metal component and at least one active tungsten hydrogenation metal component, on an amorphous porous refractory oxide comprising an ultrahydrophobic zeolite having a less than 1 weight percent of alkali metal components, calculated as the oxide, and a dispersion of silica-alumina in an alumina matrix, with a feedstock having at least 90 percent of the components boiling below 371° C. and containing at least 5 volume percent of aromatic compounds under aromatic saturation conditions, including an elevated temperature and elevated pressure, and the presence of hydrogen, said aromatic saturation conditions yielding less than 5 percent cracking of said components of said feedstock and at least about 10 volume percent conversion of said aromatic compounds in said feedstock to product components containing more saturated forms of said aromatic compounds.

13. The process defined in claim 13 wherein said aromatic saturation conditions include a hydrogen partial pressure less than about 1,500 p.s.i.g.

14. The process defined in claim 12 wherein said feedstock contains nitrogen and said process further comprises simultaneous denitrogenation of said feedstock.

15. The process defined in claim 12 wherein said ultrahydrophobic zeolite has a unit cell size in the range from about 24.15 to 24.45.

16. The process defined in claim 12 wherein said ultrahydrophobic zeolite comprises LZ-10.

17. The process defined in claim 12 wherein said feedstock is a diesel fraction comprising at least about 10 volume percent of aromatic compounds.

18. The process defined in claim 1 wherein said aromatic compounds comprise about 10 to about 60 volume percent of said feedstock.

19. The process defined in claim 18 wherein said feedstock contains sulfur and said process further comprises simultaneous desulfurization of said feedstock.

20. The process defined in claim 19 wherein said feedstock comprises a diesel fraction boiling substantially in the range from 140° C. to 371° C.

21. An aromatic saturation process comprising contacting a particulate catalyst comprising about 2 to about 6 weight percent of nickel components, calculated as NiO, and about 17 to about 27 weight percent of tungsten components, calculated as $WO_3$, on a support comprising a dispersion of at least 50 weight percent of silica-alumina in an alumina matrix and a modified Y zeolite having a unit cell size less than 24.45 and a silica/alumina ratio greater than 4.5, with a hydrocarbon-containing feedstock containing at least 10 volume percent of aromatic compounds and having substantially all components boiling at a temperature less than 371° C. under aromatic saturation conditions including the presence of hydrogen, a temperature range from about 250° C. to about 382° C. and a total pressure in the range from about 500 to about 1,400 p.s.i.g. and further yielding less than 5 percent cracking of said components of said feedstock, to produce a product having more saturated forms of said aromatic compounds.

22. The process defined in claim 21 wherein said feedstock comprises a diesel fuel.

23. The process defined in claim 22 wherein said zeolite comprises LZ-10.

24. The process defined in claim 23 wherein said support has an overall $SiO_2$ content of about 35 to about 80 weight percent.

* * * * *

UNITED STATES PATENT AND TRADEMARK OFFICE
CERTIFICATE OF CORRECTION

PATENT NO. : 5,030,780
DATED : July 9, 1991
INVENTOR(S) : John W. Ward and Dennis D. Delaney It is certified that error appears in the above-indentified patent and that said Letters Patent is hereby corrected as shown below:

Claim 13, column 14, line 15, change "13" to -- 12 --.

Signed and Sealed this

Thirteenth Day of July, 1993

Attest:

MICHAEL K. KIRK

*Attesting Officer*    *Acting Commissioner of Patents and Trademarks*